United States Patent [19]

Hayner

[11] Patent Number: 4,647,309

[45] Date of Patent: Mar. 3, 1987

[54] WATERBORNE FIRM COATING FOR TEMPORARY PROTECTION OF PARTS, PROVIDING CONTROLLED LUBRICATION DURING ASSEMBLY

[75] Inventor: Roger E. Hayner, Flatwoods, Ky.

[73] Assignee: Ashland Oil, Inc., Ashland, Ky.

[21] Appl. No.: 709,274

[22] Filed: Mar. 7, 1985

[51] Int. Cl.⁴ ............................................... C04B 9/02
[52] U.S. Cl. .............................. 106/14.13; 106/14.15;
   106/14.18; 106/14.34; 106/271; 106/272;
   427/27; 427/428; 427/429; 427/435
[58] Field of Search ................. 106/10, 270, 271, 272,
   106/14.13, 14.15, 14.18, 14.34; 427/27, 428,
   429, 435

[56] References Cited

U.S. PATENT DOCUMENTS 4,479,981 10/1984 Winters et al. ...................... 427/27
4,497,919  2/1985 Varga ................................. 524/339
4,536,519  8/1985 Suzuki et al. ...................... 514/143

OTHER PUBLICATIONS

Derwent Abstract, Accession No. 81-50649D/28, Japanese Patent No. J56059879-A, Oct. 20, 1979.

Primary Examiner—Amelia B. Yarbrough
Attorney, Agent, or Firm—Richard C. Willson, Jr.; Mary L. Beall

[57] ABSTRACT

A waterbase coating composition for use in protecting the threads of metal studs during automotive production line phosphating, electrostatic painting and welding. Composition also provides controlled lubricity as well as even torque during the tightening sequency of fasteners by robotics.

21 Claims, No Drawings

WATERBORNE FIRM COATING FOR TEMPORARY PROTECTION OF PARTS, PROVIDING CONTROLLED LUBRICATION DURING ASSEMBLY

BACKGROUND OF THE INVENTION (1) Field of the Invention

The present invention relates particularly to organic coating compositions and methods for their use generally classified in Class 106, Subclasses 14.11, 14.13, 14.34, 14.35, 14.41, 270, 271 and 272; and Class 427, Subclass 435.

(2) Description of the Prior Art

U.S. Pat. No. 4,479,981 to Winters and Savell discloses thixotropic, water reducible, dispersible, corrosion resistant coating comprising: (1) usually one or more waxes, (2) one or more organic sulfonates, (3) one or more surfactants, (4) one or more coupling agents which are carefully selected to result in a final dispersion stable at higher temperature, and (5) water. Preferred compositions comprise amine salts of blended microcrystalline waxes in which the waxes have an acid number of 7-200 and the amine is preferably morpholine with C-8-30 carboxylic acid, preferably oleic, an overbased alkaline earth sulfonate, e.g., SACI, an alcoholic coupling solvent, e.g., propyl glycol ether and water. This patent claims anti-corrosive, storage stable, rapidly drying, emulsified oil in water and water reducible and dispersible coating compositions having a pH in the range of 7.0 to 10, and capable of application and flow on a solid substrate, comprising: (a) about 0.5 to 30% by weight of organic wax components having a melting point above about 50° C.; said wax containing ester groups; (b) about 0 to 30% of a polyol ester derived from the polyester of one of: stearic acid, isostearic acid, oleic acid and lanolinic acid, and a polyol selected from the group consisting of: neopentyl glycol, trimethylol propane, pentaerythitol and dipentaerythritol; (c) about 0.5 to 60% of a surfactant; (d) about 10 to 30% of a coupling agent, comprising a $C_5$–$C_{30}$ liquid hydrocarbon coupling component and $C_2$–$C_{20}$ alcohol in a ratio of between 1:1 and 10:1 by weight respectively, selected from the group consisting of: mineral spirits, kerosene, 140-solvent, ethylene glycol ether, butyl cellosolve, diethylene glycol monoethyl ether, ethylene glycol monopropyl ether, propyl cellosolve, ethyl cellosolve, diethylene glycol monoethyl ether, ethylene glycol monoacetate, diethylene glycol monoproprionate, diethylene glycol monoacetate, propylene glycol monoacetate, ethanol, isopropanol and isobutanol. Column 13, Table II, Example I, of this patent includes 1% by weight of Penn Color Black 31B107, a 40% carbon black composition, added to provided opacity.

U.S. Pat. No. 4,444,802 to Winters et al discloses a waterborne coating composition capable of high temperature (e.g. 52° C.) storage stability able to form a film but flexible lubricating, corrosion preventative film.

U.S. Pat. No. 4,444,803 to Winters et al discloses a waterborne coating composition of high temperature (e.g. 52° C.) storage stable to form a soft but non-tacky, flexible, hot water removable, low odor, lubricating, corrosion preventative film.

U.S. Pat. No. 3,539,367 to Yaroshevich discloses a wax emulsion containing a salt and an organic acid and an amine.

U.S. Pat. No. 3,660,128 to Sheldahl teaches an alkanolamine and an alaphatic carboxylic acid in the preparation of a semi-solid-wax-in-water emulsion.

U.S. Pat. No. 2,349,326 to Wilson teaches a combination of morpholine and a fatty acid to emulsify waxy materials in water for paste type waxes.

U.S. Pat. No. 3,125,453 to Simmons employs a mixture of triethanolamine and an acid to emulsify a mixture of waxes used for paste type polishes.

Most of the above teach production of temporary coatings such as floor waxes, cosmetics and the like.

Other U.S. patents of interest include:

U.S. Pat. No. 3,539,367 to Yaroshevich, relating to catatonic emulsions (the compositions of the present invention are not catatonic emulsions);

U.S. Pat. No. 4,035,514 to Davis, relating to a water dispersible petrolatum composition containing cetyl alcohol, lanolin alcohols and alkoxylate fatty acid esters of sorbital;

U.S. Pat. No. 3,660,128 to Sheldahl, relating to inverted wax emulsion pastes for artwork;

U.S. Pat. Nos. 2,349,326 to Wilson and 3,125,453 to Simonds both relating to paste type polishes;

U.S. Pat. Nos. 2,862,825 to Westlund et al and 2,943,945 to Saywell and 3,565,843 to Kassinger all relating to soluble oils, not to firm wax coatings;

U.S. Pat. No. 3,434,851 to Miller, relating to solventborne asphalt coatings;

U.S. Pat. Nos. 3,446,764 to Phillips, 3,699,065 to Clark; 4,184,991 to Schuerman III, 3,223,666 to Botton; 3,379,548 to Jen; 4,039,495 to Hunsucher; 4,051,089 to Tobias and 4,081,411 to Hunsucher all relating to base resin formulas not to completed coatings;

U.S. Pat. No. 3,494,882 to Andrews, relating to high gloss emulsified polyester emulsions;

U.S. Pat. No. 4,187,204 to Howard, relating to waterborne paint containing not over 10% water;

U.S. Pat. No. 4,225,477 to Vosishth and Wang, relating to co-solvent changes in waterborne coatings to control re-coatability (the coating's ability to form a substrate for a topcoat);

U.S. Pat. No. 4,148,948 to Williams, relating to a leveling additive for water dispersible paints; and U.S. Pat. No. 3,413,227 to Howard and Randell, relating to substituted benziotriazole.

Other patents considered in preparing this application are:

U.S. Pat. Nos. 3,879,335-Storck; 2,695,910-Asseff; 3,565,678-Johnson; 4,239,648-Marshall; 4,059,452-Nishijima; 3,653,931-Burchart; 3,985,584-Chan; 4,048,374-Kotzach; 3,839,051-Carreny; 3,903,346-Delcon; 3,864,322-Yalloorakis; 4,062,821-Hung; 3,773,550-Tomalia; 4,035,514-Davis; 4,162,920-Gillich; 3,661,796-Erby; 3,313,635-Wollak; 3,080,221-Fessler; 3,738,851-Jarvis; and 3,726,807-Johnson.

The above cited references do not teach a protective lubricant coating resistant to phosphating, electrostatic painting and high welding temperatures, wherein the proper lubricity is obtained through the addition of carbon black.

SUMMARY (1) General Statement of the Invention

The present invention relates to a water base coating wax emulsions developed for coating threaded parts e.g. metal studs used in vehicle manufacture. The coating functions as a thread protectorant during production line phosphating, and electrostatic painting and can withstand high temperatures e.g. during the welding of studs to plate metal parts. Also, and most importantly, this protective coating can provide controlled lubricity and an even torque throughout the tightening sequence of fasteners by robotics.

The coating compositions of the present application which are capable of application and flow on a solid substrate, comprise:
 (a) one or more waxes,
 (b) one or more surfactants,
 (c) one or more coupling agents,
 (d) water, and
 (e) carbon black.

(2) Utility of the Invention

Phosphating and electrostatic painting of stud fasteners in automobile assembly lines causes fouling of the stud threads, disrupting robot assembly of vehicle components. Manufacturers have long sought a product which would protect the stud threads during phosphating and electrostatic painting as well as protect the threads from the high temperatures caused by welding. Not only was the product required to protect the threads, but it must also act as a lubricant providing an even torque without chatter in the tightening sequence performed by robots. In the absence of such a protective, lubricant coating, it is estimated that it costs between $80 and $90 U.S. currency per vehicle for a person to manually apply rubber caps to protect these threads, caps which must later be removed prior to final assembly. Since the protective coating composition of the present application also provides the proper lubricity for smooth torquing during robotic assembly, the composition remains on the studs and does not require removal.

DESCRIPTION OF THE PREFERRED EMBODIMENTS

Starting Materials

The composition of the present invention basically comprises the inclusion of carbon black in the referenced composition of U.S. Pat. No. 4,479,981 to Winters et al, the components of which are described below:

Waxes

Preferably the compositions of the present invention will include refined microcrystalline wax, which contains less than 0.1 to about 5 and more preferably 0.1 to about 3 weight percent oil based on the weight of the wax, combined with esterified waxes through other types of wax may occasionally be substituted for specialized applications. Preferred wax melting points will be above 50° C. (148° F.), more preferably from 60° C. to 100° C. (140° F. to 212° F.) and more preferably from 65° C. to 90° C. (150° F. to 194° F.). Such mirco waxes can be naturally derived, e.g. those manufactured in the processing of petroleum crude oils, or synthetically manufactured, e.g. polyolefin waxes such as polyethylene or polypropylene waxes. The average molecular weight of the waxes useful in the present invention should be selected so as to provide good film formation and permanence. However, molecular weight is not narrowly critical and will be easily selected by those skilled in the art. Also, the degree of branching in the wax molecules should be selected so the average degree of crystallinity permits the wax to be easily dispersed and to be compatible with the other ingredients of the particular formulation being produced. Chain branching provides sites for esterification in the case of oxygenated waxes; these are also suitable for use in most applications with the present invention. Oxygenated waxes (oxwax) will preferably have an acid number in the range of from about 15 to about 200, most preferably from 25 to about 45. The wax preferably contains at least 50% essentially saturated wax based on the total weight of the wax.

Specific waxes useful for the present invention include: natural waxes, such as semi-refined paraffin available from Shell Oil of Houston; petrolatum, widely available; synthetic waxes, such as polyethylene waxes available from Bareco Corporation of Tulsa, Okla. or the Epolene brand available from Eastman Kodak of Rochester, N.Y. or oxygenated waxes, which can be readily manufactured in petroleum refineries utilizing well-known techniques, or those available from Durachem Corporation of Harrison, N.Y. Other include: Polywax 55 (Bareco), Mobil Microwax 2305 a microcrystalline wax (Mobile Oil) and Hoechst Wax KSL, an esterified wax.

The amount of wax to be utilized with the present invention is not narrowly critical. For most formulations the wax content will be from about 0.5 to 30%, and more preferably from about 5 to 27% by weight of the composition (total formulation).

Surfactants

Surfactants useful with the present invention include natural surfactants such as salts of oleic acid, e.g. morpholine salts of oleic acid, or the similiar salt of triethanolamine and entirely synthetic surfactants such as alkanol amides, e.g. WHC by Stepan Chemical Company of Chicago, Ill. (oleyl diethanol amide), sorbitan monooleates manufactured by ICI America of Wilmington, Del. isostearic acid salts, coconut oil salts, lauric acid salts and the like. Excess carboxylic acid, e.g. in the wax components, can react with amines in situ to form salts which act as surfactants. The preferred range is 2 to 8% carboxylic acid and 1 to 5% amine. All or part of the surfactant can be organic sulfonates, e.g. alkyl lauryl sulfonate or alkyl benzene sulfonates.

Suitable surfactants comprise the reaction products of amines such as morpholine, ethanolamine, triethanolamine, ammonia, diethanolamine and trithanolamine with carboxylic acids such as those mentioned above. The compositions of the present invention will generally include surfactants in the amount of from about 0.5 to about 6, more preferably from about 3 to about 5 and most preferably from about 3 to about 4 percent by weight of the referenced composition. However, this will vary in response to the selection and quantities of the other ingredients employed.

Coupling Agents

The use of coupling agents is a special feature of the invention.

Several types of coupling agents can be employed with the invention including liquid hydrocarbon solvents, kerosene and mineral spirits, e.g. ethylene glycol ethers, preferably butyl and propyl ethers; hydroxy ethers (ether-alcohols), such as propyl cellosolve (Ektasolve EP manufactured by Eastman Kodak of Rochester, N.Y.), diethylene glycol monoethyl ether, monopropyl ether of ethylene glycol, propyl cellosolve, ethyl cellosolve, and diethylene glycol monoethyl ether, and other coupling agents which will be evident to those skilled in the art for use in specialized formulations according to the present invention. The coupling agent is selected by physical test; anything which does not interfere with the formulations of the present invention and which renders their ingredients mutually soluble in the water base will generally be acceptable.

Alcohol ether-esters may also be used e.g. ethylene glycol monoacetate, diethylene glycol monoproprionate, diethylene glycol monoacetate, and propylene glycol monoacetate.

Alcohols, such as ethanol, isopropanol and isobutanol will generally be useful as coupling agents for the invention. Other commercial coupling agents which are useful with formulations of the present invention include: Ektasolve EP, manufactured by Eastman Kodak of New York, and Propasol P, manufactured by Union Carbride of Danbury, Conn.

The coupling agents of the present invention will generally be employed in quantities of from about 10% to about 30% by weight of the referenced composition or more, more preferably from about 15 to about 25%, and most preferably from about 16 to about 22% based on the weight of the referenced composition. In addition to acting as a coupling compound, the coupling agent will usually be useful during the drying and curing process after application of the coatings composition of the present invention to substrates. For example, when carefully selected, the coupling agent will form an azeotrope with the water present in the formulation, thus increasing volatility, speeding cure, and providing a more permanent coating. Some coupling agents will assist the final coating in other ways, e.g. by providing leveling of the final coating, avoiding pin holes and providing a more continuous, better quality dry film.

Water

Deionized water will preferably be employed with the formulations of the present invention in order to prevent reaction of chlorine, calcium, magnesium or other components of tap water from interfering with the formulations or their curing. Distilled water could, of course, be employed but will generally be avoided for economic reasons.

The referenced composition will generally contain a minimum of about 30%, more preferably 40% and most preferably 45% or even more of water based on the total weight of the referenced composition. As the formulations of the present invention are generally classifiable as oil-in-water emulsions of special character, a quantity of water greater than about 92% may cause swelling and loss of wetting properties in most of the formulations of the present invention although specialized formulations utilizing carefully selected non-aqueous ingredients may tolerate water up to an amount of 97% by weight based on the weight of the referenced formulation.

pH

The pH of the finished formulations will be preferably in the range of 7.0–10 with 8.0–9.0 being preferred. The nature of the emulsion will depend heavily upon the amount of soap produced when the emulsifying agent (fatty acid) is neutralized with an alkaline material (e.g. amines, triethanolamine, morpholine). One should slightly overbase (make alkaline) the system to obtain maximum soap production by reacting by residual acids which may be left over at the normal end point of titration. Excessive amounts of base will form an extremely "hard" salt which is not miscible in water, thus causing the aqueous and non-aqueous phases to separate.

Carbon Black

According to the present invention, carbon black is added to a coating composition described and claimed in U.S. Pat. No. 4,479,981. This referenced coating composition, which did not meet the test requirements for use in the automotive assembly line required additives to reduce lubricity and still provide the even torque sequence. Addition of 2–10% by weight of a carbon composition to 90–98 weight percent of the coating composition generally provides best results for even torquing in tests, without destroying the resistance to welding, phosphating, and electrostatic paint application.

A preferred carbon black composition range is 3.5 to 7% and most preferred range is 4 to 5% by weight of the total formulation. The carbon black composition used in the present application is a dispersion comprising 40% by weight of carbon black in water with small amounts of water reducible acrylic resin, ethylene glycol and some tertiary amine to maintain the carbon black evenly dispersed in the water. This particular composition can be obtained from Penn Color, Inc. of Doylestown, Pa. under the name of Penn Color Black 31B107. The actual amount of carbon black present in the lubricant coating composition is about 0.4 to 4% and preferably 1.4 to 2.8% and most preferably 1.6 to 2.0% by weight.

The addition of the carbon black reduces the lubricity of the referenced coating composition and provided evenness of torque.

Water

While carbon black is the main ingredient to be added to the referenced composition according to the present invention, water is also found to provide the proper viscosity for dipping as well as a uniform film application to the threads of the stud. Water is added in the range of 5 to 20% by weight of the total formulation.

Butyl Cellosolve

The addition of butyl cellosolve along with the carbon black also aids in the production of the proper viscosity in uniform film. Butyl cellosolve is added in a range of 1 to 5% by weight of the total formulation.

Additives

Additives such as fumed silica, carbonates, talcs and inert materials are also useful according to the present invention. These additives are added to the referenced composition with the carbon black in a range of about 1 to 14% by weight of the total formulation. Specific additives useful in the present invention are Veroc No. 1 calcium carbonate available from White Pigment Corporation of Clifton, N.J.; Aerosil 972 fumed silica available from Degussa Corporation of Teterboro, N.J.; and Cabosil No. 5 fumed silica available from Cabot Corporation of Boston, Mass.

Techniques in Mixing

The composition of the reference application is mixed as follows:

Apparatus: The apparatus for the present invention will be that conventionally utilized in the preparation of coatings compositions, e.g. kettles and mixing tanks having flow metering or measuring devices and agitation means, e.g., pumps mounted on side-arms connecting with the main vessel, internal stirrers, contra-rotating shearing devices and any of the other available devices which are well known to the art.

Temperature: The temperature during mixing may be different during different stages in the formulation. In general, the water will be at about 93° C. (200° F.), the non-aqueous ingredients will be transferred and mixed together at about 107° C. (225° F.). However, these temperatures are not narrowly critical and will vary to provide faster mixing or better compatibility of ingredients according to observation of those skilled in the art. For example, pressure vessels may be utilized for the purpose of lowering ingredient melting and boiling points, where useful, in order to provide better dispersion of difficult-to-mix ingredients.

Mixing Procedure: While the formulations of the present invention may be manufactured continuously if desired, batch techniques will be more usually employed. For example, the total amount of water desired in the finished formulation (e.g. 1700 gallons, 6,562 liters) is heated in a mixing vessel large enough to hold the entire batch of formulation until the water temperature is approximately 90° C. (195° F.). The wax, surfactants, coupling agents and any other non-aqueous ingredients are heated in a separate vessel until the temperature reaches about 107° C. (225° F.) with the various non-aqueous ingredients being added slowly while the vessel is agitated with conventional mixer. The neutralizing ingredient, e.g. morpholine, triethanolamine, will be added after the other ingredients have been thoroughly mixed. After neutralization, which is generally visually observations a distinct increase in viscosity, the non-aqueous ingredients are allowed to mix for 15 to 30 minutes and transferred over to the aqueous phase, which is agitated during the addition of the non-aqueous phase. Heating is discontinued after addition of the non-aqueous phase.

To the thus produced referenced coating composition are then added the carbon black, water, butyl cellosolve and additives of the present invention. The carbon black, water and butyl cellosolve are mixed in by simple mixing. If fumed silica is to be added, a high speed disperser type apparatus must be used to thoroughly mix the silica into a composition.

Calcium carbonate must be added slowly with regular mixing.

Quality Control

The finished formulation, prior to packaging will generally be checked for pH, solids content, freeze-thaw stability, corrosion-protection under accelerated conditions and other tests utilizing techniques well known to the coatings industry.

Application

The formulations of the present invention may be applied to substrates to be protected by conventional application techniques, such as spraying, brushing, roller-coating, dipping, flow-coating, electrostatic airless spraying.

EXAMPLE I 52.6 parts by weight of deionized water are charged to a conventional mixing kettle rotary agitator and brought to a boil. In a second vessel, 19.13 parts of Mobil Microwax 2305, a microcrystalline wax, 6.95 parts Hoechst Wax KSL, an esterified wax are charged. To the second vessel is also added 8.70 parts of 140-solvent (mineral spirits), 3.04 parts of Emory 220 oleic acid and 6.96 parts Ektasol EP. The mixture in the second vessel is heated to 107° C. (225° F.) with agitation. 1.74 parts of morpholine and 0.87 parts of triethanolamine are then added, and, after a few minutes, a thickening is observed, indicating that the neutralization action has proceeded. The heating is stopped and the contents of the second vessel are immediately transferred to the vessel containing the water while stirring continuously. Heating is then terminated and the mixture continuously agitated until it cools to 38° C. (100° F.). The pH is then adjusted to about 8.5 by the addition of triethanolamine. About 3 parts of water are added to compensate for water loss during heating.

To 94.90% of a coating composition thus created and described above is added 5.1% of Penn Color Black 314B107 with thorough mixing to produce the lubricant protective coating of the present invention. This product gives excellent performance and provided the best results for even torquing without destroying the resistance to welding, phosphating and electrostatic paint application. The product is used both in air drying and baking (250° F. for 2–10 minutes) applications with good results. This example and Examples II through XIII are summarized in Table I below.

TABLE I

| Example | Referenced Composition | Penn Color Carbon Black 314B107 | H₂O | Butyl Cellosolve | CaCO | Fumed Silica | Notes & Results |
|---|---|---|---|---|---|---|---|
| I | 94.9* | 5.1 | — | — | — | — | Moderate level addition of carbon black. This gave excellent performance with all testing involved. |
| II | 86.4 | 4.5 | 7.3 | 1.8 | — | — | 10% cutback of Example I using 80/20 mixture of water/butyl cellosolve. |
| III | 80.8 | 4.3 | 11.9 | 3.0 | — | — | 15% cutback of Example I using 80/20 mixture of water/butyl cellosolve. |
| IV | 76.0 | 4.3 | 16.0 | 14.0 | — | — | 20% cutback of Example I using 80/20 mixture of water/butyl cellosolve. |
| V | 72.5 | 7.0 | 16.4 | 4.1 | — | — | Higher level of carbon black addition than in Example IV. Lower lubricity, good viscosity. |
| VI | 79.4 | 2.9 | 16.9 | — | 0.8 | — | Low level of calcium carbonate, moderate level of carbon black, 17% cutback with water only. Low viscosity with lower lubricity. |
| VII | 72.2 | 3.8 | 15.2 | 3.8 | 5.0 | — | Lower level of carbon black, mod- |

TABLE I-continued

| Example | Referenced Composition | Penn Color Carbon Black 314B107 | H$_2$O | Butyl Cellosolve | CaCO | Fumed Silica | Notes & Results |
| --- | --- | --- | --- | --- | --- | --- | --- |
| | | | | | | | erate level as in Example VIII calcium carbonate, and 19% cutback with 80/20 water/butyl cellosolve. |
| VIII | 74.7 | 4.3 | 12.6 | 3.2 | 5.2 | — | Moderate addition of calcium carbonate to 15% cutback of Example I. Viscosity increase found, dramatic reduction in lubricity of product. |
| IX | 69.8 | 4.7 | 9.3 | 2.3 | 13.9 | — | High level calcium carbonate added to a 11/6% cutback of Example I. Gave high viscosity not suitable for dip. |
| X | 65.36 | 3.44 | 13.76 | 3.44 | 14.0 | — | Lower level of carbon black, high level of calcium carbonate as Example IV, 17% cutback with 80/20 water/butyl cellosolve. Gave high viscosity, low lubricity, too heavy for dip. |
| XI | 97.0 | 1.0 | — | — | — | 2.0 | Low level of carbon black, fumed silica addition, resulted in excessive thickening of product. |
| XII | 96.9 | 1.1 | — | — | — | 2.0 | Similar to Example XI, only using a different type of fumed silica. Again, the end result was an excessively viscous product not suitable for dip. Allowed too much product to be built up in thread. Caused chattering upon torque testing. |
| XIII | 95.0 | — | — | — | — | 5.0 | No carbon black, moderate level of fumed silica addition resulted in a very high viscosity product, not suitable for dipping. |

*weight % of total formulation

QUALITY CONTROL

The finished formulations prior to packaging will generally be checked for pH, solids content, freeze-thaw stability, corrosion-protection under acceleration conditions and other tests utilizing techniques well known to the coatings industry.

APPLICATION

The formulations of the present invention may be applied to substrates to be protected by such conventional application techniques, such as spraying, brushing, roller-coating, dipping, flow-coating and electrostatic airless spraying.

DISCUSSION

The lubricant protective coating compositions of the present application are improvements on the composition generally claimed in U.S. Pat. No. 4,479,981. This patent uses 0 to 30% by weight of a polyol ester, whereas the compositions of the present application use no polyol ester and incorporate carbon black. Other components such as additional water, butyl cellosolve, calcium carbonate and fumed silica may also be included. Although Table II of U.S. Pat. No. 4,479,981 does show that 1% by weight of Penn Color Black can be added to the referenced composition, this carbon black is listed under the title "Pigment" and is used as an opacifying agent. This composition failed to meet the test requirements of the automotive assembly line.

According to the present application, the addition of carbon black to the completed referenced composition reduces the lubricity of the composition and still provides the required even torquing sequence without destroying the resistance to welding, phosphating and electrostatic paint application. The composition of the present application fulfills all the test requirements of the automotive assembly line.

This invention is a modification of the referenced composition product to perform in a specific, controlled application. Other additives used experimentally to reduce the lubricity were found to thicken the system to an unacceptable viscosity, to increase chatter, and to give uneven torquing in tightening the fastener, even at low levels of addition.

MODIFICATIONS

It will be understood by those skilled in the art that the invention is not to be restricted by the examples which merely illustrate the invention and that the invention is susceptible to a wide variety of modifications and variations without departing from the spirit therefrom. For example, the formulations may contain other useful ingredients such as biocides, anti-foaming agents, pigments, dyes, and leveling agents, well known to those skilled in coatings technology. The above referenced and documents cited therein are hereby incorporated by reference.

Specific compositions, methods, or embodiments discussed are intended to be only illustrative of the invention disclosed by this Specification. Variation on these compositions, methods, or embodiments are readily apparent to a person of skill in the art based upon the teachings of this Specification and are therefore intended to be included as part of the inventions disclosed herein.

Reference to patents made in the Specification is intended to result in such patents being expressly incorporated herein by reference including any patents or other literature references cited within such patents.

I claim:

1. A protective, emulsified oil in water, dispersible, lubricant coating composition having a pH in the range of about 7.0 to 10, and capable of application and flow on a threaded solid substrate consisting essentially of:
   A. about 65 to 99% by weight of a composition comprising:
      (1) about 0.5 to 30 parts by weight of organic wax components having a melting point above 50° C., said wax containing ester groups;
      (2) about 0.5 to 6 parts of a surfactant comprising 2 to 8% of carboxylic acid and about 1 to 5% of an amine, said acid and said amine forming a salt providing at least a portion of a surfactant;
      (3) about 10 to 30 parts of a coupling agent comprising a $C_5$–$C_{30}$ liquid hydrocarbon coupling component and a $C_2$–$C_{20}$ alcohol in the ratio of between 1:1 and 10:1 by weight respectively, selected from the group consisting of:
         mineral spirits, kerosene, ethylene glycol ether, butyl cellosolve, diethylene glycol monoethyl ether, ethylene glycol monopropyl ether, propyl cellosolve, ethyl cellosolve, diethylene glycol monoethyl ether, ethylene glycol monoacetate, diethylene glycol monoproprionate, diethylene glycol monoacetate, propylene glycol monoacetate, ethanol, isopropanol and isobutanol; and
      (4) about 30 to 97 parts of water the sum of all parts being equal to 100; and
   (B) about 3.5 to 9% total pigment comprising about 0.4 to 4% by weight carbon black.

2. A composition according to claim 1 in which said wax is a mixture of micro crystalline wax and wax comprising ester groups.

3. The lubricant coating composition of claim 1 wherein the coupling agent comprises propyl cellosolve and a liquid hydrocarbon solvent.

4. The lubricant coating composition of claim 1 further including about 5 to 20 by weight water.

5. The lubricant coating composition of claim 4, further including about 1 to 5 by weight butyl cellosolve.

6. The lubricant coating composition of claim 5 further including about 1 to 14 by weight additives selected from the group consisting of: silica, carbonates, talcs and inert materials.

7. The lubricant coating composition of claim 4, further including about 1 to 14% by weight additives selected from the group consisting of: silica, carbonates, talcs and inert materials.

8. A lubricant coating composition according to claim 1, wherein the amount of carbon black is about 1.4 to 2.8% by weight.

9. A lubricant coating composition according to claim 1, wherein the amount of carbon black is about 1.6 to 2.0 weight %.

10. A lubricant coating composition according to claim 1, wherein the carbon black is provided in a composition comprising 40% by weight of carbon black.

11. A method for coating threaded solid substrates, wherein said composition of claim 1, is applied to metal.

12. A method for coating threaded solid substrates, wherein said composition of claim 1 is applied by dipping.

13. A method for coating solid substrates, wherein said composition of claim 1 is applied by brushing.

14. A method for coating solid substrates, wherein said composition of claim 1 is applied by rolling.

15. A method for coating solid substrates, wherein said composition of claim 1 is applied by electrostatic spraying.

16. A method for coating solid substrates, wherein said composition of claim 1 is applied by hand spraying.

17. A method for protecting metal studs from the effects of phosphating, electrostatic painting and the high temperatures of welding as well as lubricating the studs comprising applying a coating of the composition of claim 1 to the studs.

18. A protective, emulsified oil in water, dispersible, lubricant coating composition having a pH of about 8.5, and capable of application and flow on a solid substrate comprising:
   A. about 95% by weight of a composition comprising:
      (1) about 19 parts microcrystalline wax and parts esterified wax;
      (2) about 3 parts oleic acid, 1 part triethanolamine and 2 parts morpholine;
      (3) about 7 parts propyl cellosolve and 9 parts mineral spirits; and
      (4) about 53 parts water; and
   (B). about 2% by weight carbon black.

19. A composition according to claim 1, wherein the surfactant is a reaction product of a carboxylic acid and at least one amine selected from the group consisting of morpholine, ethanolamine, triethanolamine, ammonia, diethanolamine and trithanolamine.

20. A composition according to claim 18, wherein the carboxylic acid is selected from the group consisting of oleic acid, isostearic acid and lauric acid.

21. A lubricant coating composition according to claim 1 wherein the pH of the composition is in the range of about 8.0 to 9.0.

* * * * *